United States Patent [19]

Leitzke et al.

[11] 4,252,654
[45] Feb. 24, 1981

[54] PROCESS FOR WATER TREATMENT

[75] Inventors: Ortwin Leitzke, Kaarst; Arnold Gietmann, Krefeld-Bockum, both of Fed. Rep. of Germany

[73] Assignee: Messer Griesheim GmbH, Frankfurt, Fed. Rep. of Germany

[21] Appl. No.: 48,359

[22] Filed: Jun. 14, 1979

[30] Foreign Application Priority Data

Jun. 21, 1978 [DE] Fed. Rep. of Germany ....... 2827151

[51] Int. Cl.$^3$ .............................................. C02F 1/78
[52] U.S. Cl. .................................................... 210/760
[58] Field of Search ......................... 210/63 Z, 192, 50

[56] References Cited

U.S. PATENT DOCUMENTS

| | | | |
|---|---|---|---|
| 2,050,771 | 8/1936 | Wait | 210/63 Z |
| 2,606,150 | 8/1952 | Thorp | 210/63 Z |
| 3,732,163 | 5/1973 | Lapidot | 210/63 Z |

FOREIGN PATENT DOCUMENTS 2556328  6/1977 Fed. Rep. of Germany .
365342 12/1962 Switzerland ........................... 210/63 Z

*Primary Examiner*—Thomas G. Wyse
*Attorney, Agent, or Firm*—Connolly and Hutz

[57] ABSTRACT

A process for the treatment of water in which at least a partial flow of the water is brought into contact under pressure in a packed column with an ozone-oxygen mixture from an ozonizer with the ozone and a portion of the oxygen being dissolved in the water and the undissolved oxygen being returned to the ozonizer and with the charged water being withdrawn from the column, includes branching off a partial flow from the column water to a water jet-gas compressor in which the ozone-oxygen mixture from the ozonizer is adsorbed and compresed and mixed with the partial flow after which the mixture of water, ozone and oxygen is led into the base of the packed column.

2 Claims, 1 Drawing Figure

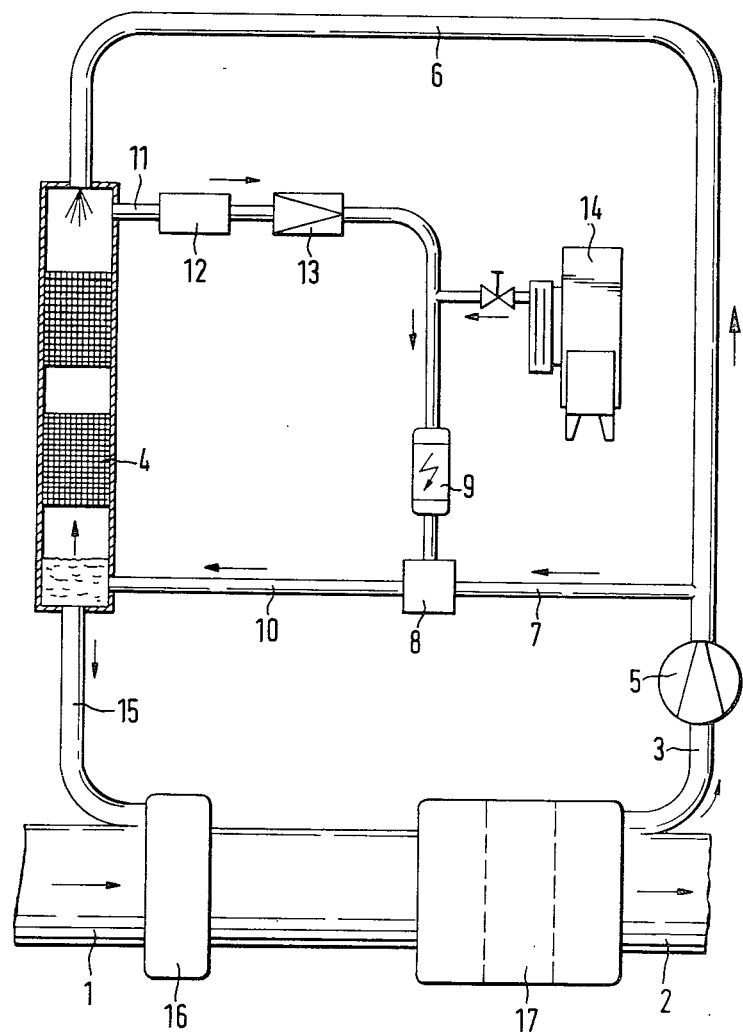

PROCESS FOR WATER TREATMENT

BACKGROUND OF THE INVENTION

The invention relates to a process for the treatment of water, particularly for treating drinking water and for purifying waste water in which, for the oxidation of undesirable substances in the water and for the improvement of the coagulation of such materials, at least a partial flow of the water is treated with ozone.

Ozone is a preferred oxidation agent for the decomposition of undesirable substances in the water. It has to be produced, however, with a high energy cost from air or from pure oxygen before it can react, brought in solution, with the harmful substances in the water. Dissolving the ozone in the water is rather difficult and requires a considerable expense in operating and capital costs. The problems are especially that ozone can only be used, among others for safety reasons, as a mixture with other gases. Normal air-ozone mixtures contain, for example, only one to two percent by weight of ozone. Washing the ozone from such mixtures if very expensive. Better are processes, on the other hand, in which ozone is produced from pure oxygen, since here higher ozone concentrations are attained from the beginning. It is, of course, a disadvantage that the ozone cannot be produced from air, which is available free of charge, but must be prepared from oxygen. Only those processes of this type are economical in operation in which the oxygen contained in the ozone-oxygen mixture is not lost, but can be used again in some form or another. The invention is, therefore, based on such a process type.

Such a process is known from German Preliminary Published Application No. 25 56 328. Ozone is prepared in high concentrations from oxygen in this process. A partial flow of the water to be treated is brought in contact in a packed column with the ozone-oxygen mixture. Almost all the ozone as well as a portion of the oxygen is dissolved in the water. The oxygen which is not dissolved is withdrawn from the column head and again led to the ozonizer.

The partial flow of the waste water highly charged with ozone is withdrawn at the base of the column and mixed with the quantity of water to be treated. The total quantity of water can also be pumped for the purpose of waste water treatment via the column, which is then simultaneously absorption and reaction chamber. The quantity of water which is led via the column is adjusted to the ozone and oxygen need of the total quantity of water to be treated.

Dissolving the ozone in the packed column takes place under pressure whereby the pressure is built up by compressing the gas with a water ring compressor and the work in the column takes place at a low temperature to increase the solubility of the ozone in the water as well as to reduce the nitrogen percentage in the circulation gas to a degree favorable for ozone production. In case the water to be treated is not under a sufficiently high pressure as yet, the water or a partial flow thereof must be brought to the column pressure with a pump.

An equilibrium occurs between the oxygen which is not dissolved in the water and the nitrogen which degases the water in the circulation gas which is again provided to the ozonizer. The equilibrium is regulated, according to the nitrogen saturation degree of the water and according to the resulting partial gas presure, by the column pressure in such a way that optimal operating conditions exist for the ozonizer.

The advantages of the known processes are found in the almost one hundred percent ozone absorption, in the nitrogen reduction in the circulation gas, in the low gas drying costs and in the doubling of the ozone quantity and ozone concentration by the use of oxygen instead of air at the same energy consumption. The lower energy consumption for drying compared to other oxygen and air processes can be explained in that the wet circulation gas has reduced, determined by the higher column pressure, its operating volumn and, therefore, also the water quantity carried along, which must be adsorbed by the drying installation.

Other known processes in which the ozone is brought in solution with turbines, immersed aerators, filter cartridges or injectors do not attain the high degree of ozone absorption as that of the known process of German Preliminary Published Application No. 2,556,328. Nevertheless, this process also has some weak points. They are the high investment cost for the packed column which must be made of V4A steel because of the aggresiveness of the ozone. Sealing and water level control for the water ring compressor are also very expensive. The sealing and rotating parts of the water ring compressor wear out easily.

SUMMARY OF INVENTION

The invention is based on the object of improving the weak points of the known process and to provide in this way a process of water treatment, for treating drinking water as well as for purifying waste water, with ozone produced from pure oxygen which is superior in performance and economy as a result of its high degree of oxygen and ozone utilization to the currently known processes for water treatment with ozone.

A process was now found for treating water, particularly for treating drinking water and for purifying waste water, in which, for the oxidation of undesirable substances in the water and for the improvement of the coagulation of such materials, at least a partial flow of the water to be treated is brought into contact under pressure in a packed column with an ozone-oxygen mixture is dissolved in the water and whereby the oxygen which is not dissolved is returned to the ozonizer and whereby the water which is charged with ozone and oxygen is withdrawn from the column, in which, according to the invention, a partial flow is branched off from the water which is provided to the packed column and is led through a water jet-gas compressor in which the ozone-oxygen mixture from the ozonizer is adsorbed, compressed and mixed with the partial flow after which the mixture of water, ozone and oxygen is led into the base of the packed column.

The mixture of water, ozone and oxygen which leaves the water jet-gas compressor has a pressure of at least 3 bar. A pressureof at least 3 bar also prevails then in the packed column and the nitrogen percentage in the circulation gas does not exceed twenty-seven percent by volume. The advantages of the process according to the invention reside first of all in a reduction of investment cost since a water jet-gas compressor is substantially cheaper than a water ring compressor with its expensive control for blocking and operating water. The wear-sensitive rotating parts for gas compression are completely eliminated. The investment cost for the packed column for ozone absorption is, however, surprisingly also reduced. The water jet-gas compressor acts namely as a theoretical absorption step so that a theoretical phase can be eliminated in the column.

According to the invention, the total pressure for the packed column as well as for the column water and for the gas compression is, therefore, produced with only one aggregate namely a wear-resistant water pump. If the untreated water is already under sufficient pressure, even this pump can be eliminated. The water for the column head and the water jet-compressor are then drawn from the untreated water under pressure.

THE DRAWING

The single FIGURE schematically illustrates an exemplified embodiment of the invention.

DETAILED DESCRIPTION

The flow directions are shown in the drawing by arrows without numbers. The untreated water which enters the installation is designated with 1, the pure water which leaves the installation is designated with 2. A partial flow 3 in which ozone and oxygen will be dissolved in the packed column 4 is branched off from the pure water 2.

The partial flow 3 can also be branched off from the untreated water 1. The pressure of the partial flow 3 is increased by means of a booster pump 5. Behind the booster pump 5, the partial flow 3 is subdivided in two other partial flows 6, 7. The partial flow 6 is immediately directed to the head of the packed column 4. The partial flow 7 flows through the water jet-gas compressor 8 and adsorbs here an ozone-oxygen mixture from the ozonizer 9. The ozone-oxygen-water mixture 10 created in this way is introduced in the base of the packed column 4. The pressure increase by means of the booster pump 5 must be so large that an adequate ozone-oxygen mixture can be adsorbed from the ozonizer 9 and the ozone-oxygen-water mixture behind the water jet-gas compressor 8 has at least a pressure of 3 bar. A pressure of at least 3 bar then also prevails in the packed column 4 and the nitrogen percentage in the circulation gas cannot exceed twenty-seven percent by volume.

A portion of the ozone adsorbed in the water jet-gas compressor is dissolved in the water of the partial flow 7. The remainder rises in the packed column 4 as gas and is dissolved by the water of the partial flow 6.

The oxygen which is not dissolved leaves the head of the packed column 4 through pipe 11. It arrives again in the ozonizer 9 after flowing through a dryer 12 and a pressure reducer 13. The consumed oxygen is replaced from the oxygen supply container 14.

The water charged with ozone leaves the sediment of the packed column 4 through the pipe 15 and is mixed in the reaction phase 16 with the untreated water 1. After flowing through the post-treatment installation 17 where an addition of chemicals, post-coagulation and filtration takes place, the pure water 2 is obtained.

The column height is adjusted to the desired ozone adsorption effect, to the previously determined gas and water ratios. The water jet-gas compressor 8 assumes in addition to its assignment of compression the function of a theoretical ozone absorption step so that the packed column 4 can have one theoretical phase less then usual. Nevertheless, an almost one hundred percent ozone absorption is attained.

It is also possible in the purification of waste water to lead the total untreated water via the packed column 4 so that the reaction step 16 is eliminated.

What is claimed is:

1. In a process for the treatment of water, particularly for treating drinking water and for purifying waste water in which, for the oxidation of undesirable substances in the water and for the improvement of the coagulation of such materials, at least a partial flow of the water to be treated is brought into contact under pressure in a packed column with an ozone-oxygen mixture from an ozonizer, whereby the ozone and a portion of the oxygen is dissolved in the water and the oxygen which is not dissolved is returned to the ozonizer and whereby the water which is charged with ozone and oxygen is withdrawn from the column; the improvement being a partial flow is branched off from the water which is provided to the packed column and is led through a water jet-gas compressor in which the ozone-oxygen mixture from the ozonizer is adsorbed and compressed and mixed with the partial flow after which the mixture of water and ozone and oxygen is led into the base of the packed column.

2. Process according to claim 1, characterized in that the mixture of water and ozone and oxygen which leaves the water jet-gas compressor has a pressure of at least 3 bar.

* * * * *